Feb. 3, 1959 H. E. HOLLMANN ET AL 2,872,529

APPARATUS FOR RECORDING SIGNALS

Filed March 10, 1953 2 Sheets-Sheet 1

INVENTORS
HANS E. HOLLMANN
OTTO G. SCHWEDE

BY [signature]
[signature]
ATTORNEYS

Feb. 3, 1959 H. E. HOLLMANN ET AL 2,872,529

APPARATUS FOR RECORDING SIGNALS

Filed March 10, 1953 2 Sheets-Sheet 2

INVENTORS
HANS E. HOLLMANN
OTTO G. SCHWEDE

BY [signature]

ATTORNEYS 2,872,529

APPARATUS FOR RECORDING SIGNALS

Hans E. Hollmann, Oxnard, and Otto G. Schwede, Ventura, Calif.

Application March 10, 1953, Serial No. 341,632
7 Claims. (Cl. 179—100.1)
(Granted under Title 35, U. S. Code (1952), sec. 266)

Figure 1:
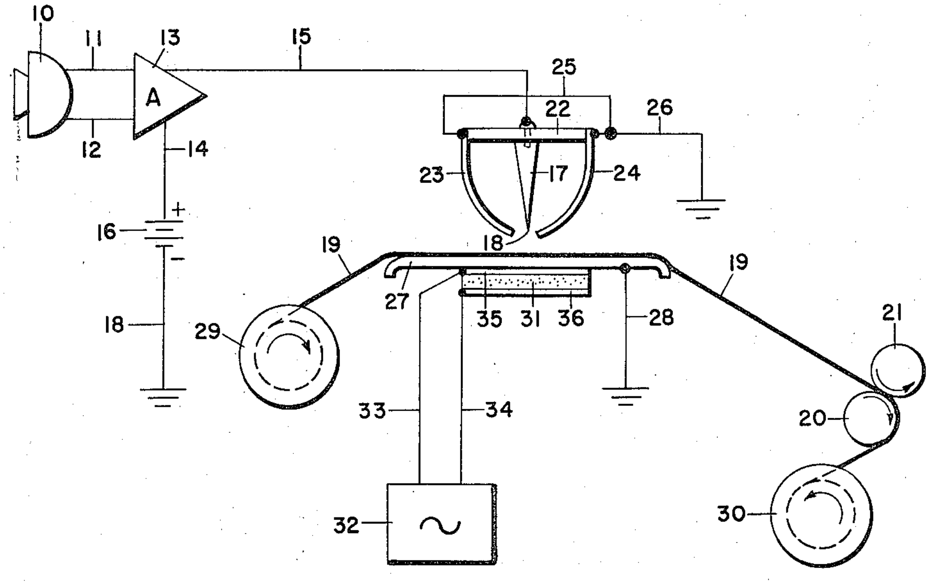

The invention described herein may be manufactured and used by or for the Government of the United States of America for governmental purposes without the payment of any royalties thereon or therefor.

The present invention relates to a signal storage article and method and apparatus for recording signals, and more particularly to a signal storage article and method and apparatus for recording signals thereon wherein the signal storage article is composed at least partially of a ferroelectric substance and the varying dielectric properties of such substances are utilized in the method and apparatus for recording signals.

The present invention may be utilized in the recording of any type of signal; however, it is particularly adapted for use in sound recording.

Heretofore, signal storage articles have been fabricated of ferromagnetic substances and the varying degrees of magnetization have been utilized in the method and apparatus for recording with such articles.

As is well known, when recording with magnetic tapes, wires or discs, the power requirements are high because of the ohmic losses occurring in the coil and the hysteresis losses occurring in the ferromagnetic core used with conventional magnetic recorders. Further, the frequency response of magnetic recorders is relatively poor.

The present invention is shown and described in connection with its utilization in a sound recording system. The signal storage means of the present invention is composed at least partially of a ferroelectric substance, and the method and apparatus disclosed are adapted to utilize the varying dielectric properties of such a substance whereby certain disadvantages encountered with magnetic recording systems are eliminated. Since ferroelectric phenomena are utilized in the present invention, an electric field is required, thereby enabling the use of two minute electrodes instead of a bulky magnetic structure in the recording system, thus eliminating the ohmic and hysteresis losses occurring in magnetic recording heads, since it is not necessary to use a coil or a ferromagnetic core according to the invention.

A high frequency response is obtained in the present invention due to the fact that the ferroelectric storage means changes its dielectric characteristics instantaneously and very accurately in accordance with variations of the electric field impressed thereon. Furthermore, shield means is provided in the present invention to concentrate the electric field and thereby limit the signal storage area upon which the field may impinge. By so concentrating the field, it is possible to record high frequencies. A source of energy is also provided to excite the storage means in order that it may more readily change its dielectric properties under the influence of a varying electric field.

The term "ferroelectric substances" as used herein designates those substances having nonlinear electrical properties and in which individual molecular displacements caused by a polarizing field simultaneously change the dielectric constant or permittivity, the A.-C. conductivity, the dielectric losses and the power factor of the substance. Such ferroelectric substances exhibit hysteresis loops very similar to those of ferromagnetic materials, the difference being that whereas the ferromagnetic hysteresis loops are formed because of the magnetic fields within the substance and the resulting parallel orientation of electron spins of magnetic dipoles, the ferroelectric hysteresis loops are the result of the alignment of electric dipoles by mutual interaction in the nonmagnetic crystalline structure.

The fundamental phenomenon which has been discovered by the inventors and upon which the present invention is based is the fact that when a ferroelectric substance has been polarized, the dielectric constant and the power factor do not return to their original values when the polarizing field is removed, but the substance will exhibit a dielectric remanence that varies accurately in accordance with the varying strength of the polarizing electric field. The polarization of the ferroelectric substance occurs instantaneously and the remanent dielectric constant as well as the remanent A.-C. conductivity or power factor is proportional to the applied field. Hence, the storage means is extremely sensitive and permits the recording of signals at high fidelity, high signal-to-noise ratio, and up to frequencies not obtainable with previous methods of recording.

An object of the present invention is to provide a signal storage means which is very sensitive to variations in an impressed electric field.

Another object is to provide a signal storage means in which a signal track may be impressed by means of a varying electric field.

A further object of the invention is to provide a method of recording wherein a signal may be recorded by utilizing variations in an electric field.

Still another object is to provide a recording method and apparatus having low power requirements.

Yet another object is to provide a recording method and system which will have a high frequency response.

Still a further object is to provide a recording method and system which will have a high signal-to-noise ratio.

Yet another object of the present invention is to provide a recording system which is simple and inexpensive in construction, yet which is efficient and accurate in its operation.

Figure 2:
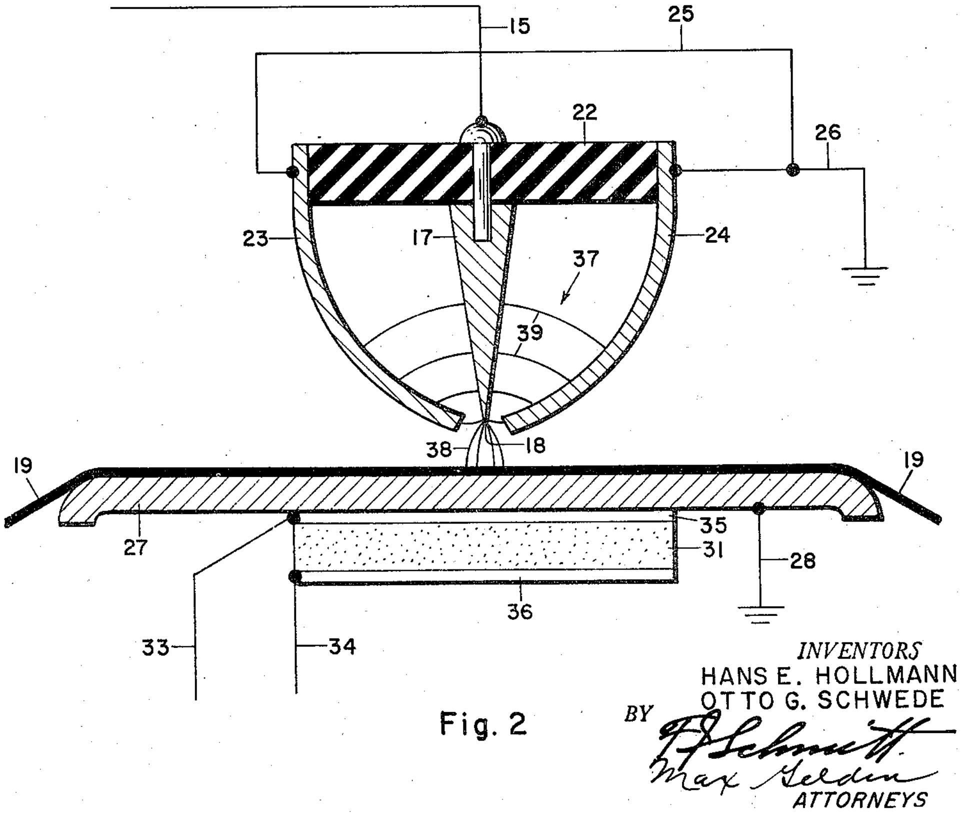
Figure 3:
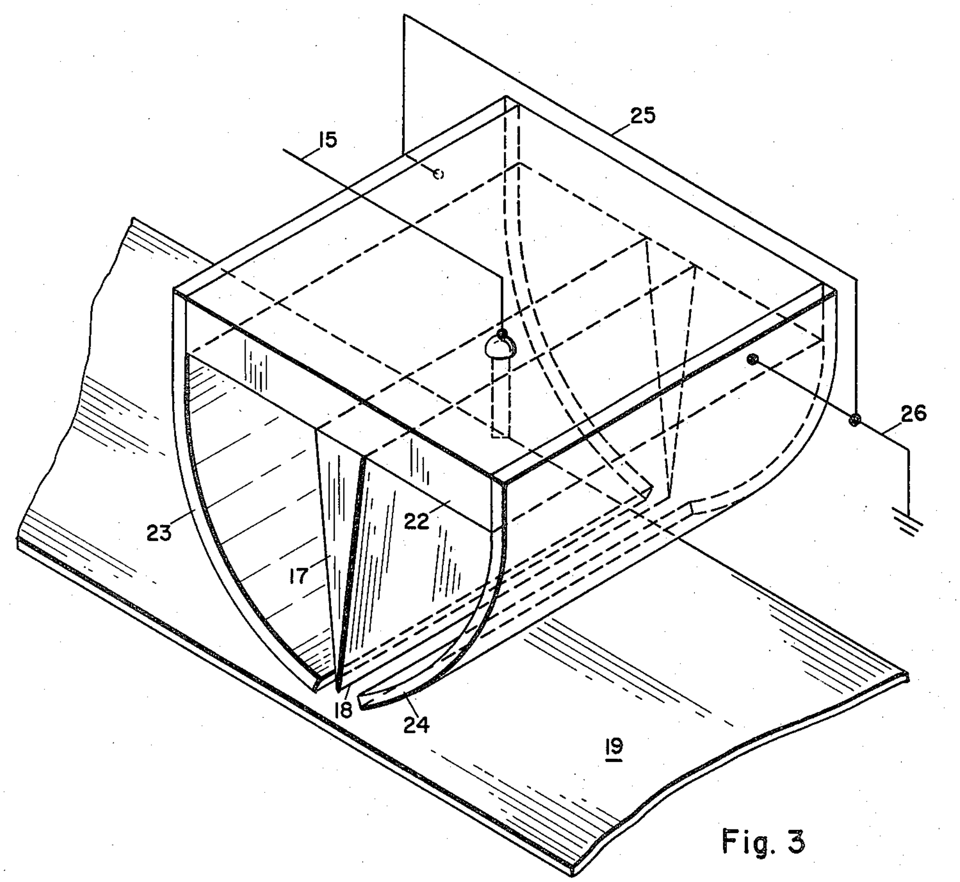
Figure 4:
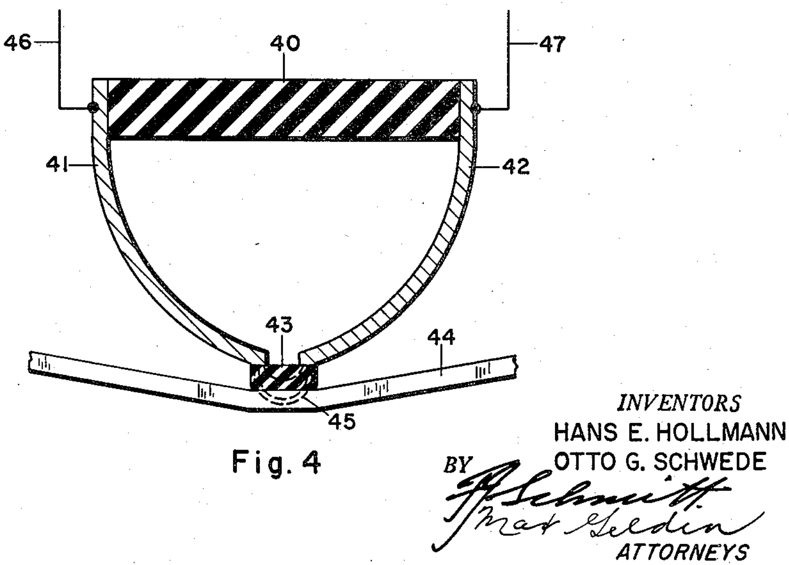

Other objects and many of the attendant advantages of this invention will be readily appreciated as the same becomes better understood by reference to the following detailed description when considered in connection with the accompanying drawings wherein:

Fig. 1 is a schematic view of a sound recording system according to the invention, Fig. 2 is an enlarged view partly in section of a portion of Fig. 1, Fig. 3 is an isometric view of a portion of Fig. 1, and Fig. 4 is a cross-sectional view of a modification of the invention.

The signal storage means of the present invention may be in any one of the conventional forms used for signal recording such as tapes, wires, strings, discs, or films. Depending upon the form of support or carrier employed, the fabrication and composition of the signal storage means will vary accordingly. In each case, the storage means must consist at least partially of a ferroelectric substance in order that the dielectric properties thereof may be utilized. For example, a storage means according to the present invention may be composed of a tape carrier formed of paper, cloth, metal, a suitable plastic, or the like, said carrier supporting a ferroelectric substance. Ferroelectric substances which can be utilized for the purpose of the invention are Rochelle salt, alkaline earth titanates such as barium, strontium and magnesium titanates, and mixtures of such titanates; mixtures of barium and lead zirconates; and the like. The preferred ferroelectric substance is a mixture of barium and strontium titanates, particularly in a proportion of about 75% barium titanate and about 25% strontium titanate. It should be understood, however, that the other ferroelectric substances in addition to those mentioned above can be employed according to the invention.

The ferroelectric substance may be interspersed or colloidally suspended in the carrier itself where the latter is a plastic material, or the carrier may be provided with a thin coating consisting of a mixture of fine ferroelectric powder and a suitable binder or base material such as waxes, glue, gelatin, synthetic resins of both the thermosetting and thermoplastic type such as acrylic resins and cellulose acetate, and the like. Thus, a ferroelectric substance may be dispersed or suspended in a base material, e. g. synthetic resin in fluid or semi-fluid condition, and a carrier, e. g. wire, coated with this mixture and the coating hardened in a known manner such as by cooling or by heating and/or use of hardening catalysts where a polymerizable resin is employed. Alternatively, the wire may first be coated with the binder or base material, the ferroelectric powder interspersed therein and the coating hardened. A disc, tape or film may be treated in a similar manner for fabrication of a signal storage means according to the invention.

As a specific example, a signal storage means can be fabricated by mixing particles of barium titanate with polymerizable acrylic resin-forming components in liquid form, the resulting suspension having a proportion of 75 parts resin-forming components to 25 parts barium titanate by weight. The suspension is then sprayed on paper tape and the suspension solidified or hardened by the application of heat.

Referring now to the drawings wherein like reference characters designate like or corresponding parts throughout the several views, there is shown in Fig. 1 a sound recording system according to the invention in which a transducing member such as a microphone 10 is connected by leads 11 and 12 to an amplifier 13 having two output leads 14 and 15 connected respectively to a battery 16 and electrode 17. The battery 16 which is connected to ground by lead 18 may serve as a bias for the recording system and also as a power supply for the amplifier. The bias voltage produced by battery 16 should be larger than the maximum amplitude of the recording voltage impressed on electrode 17. As may be more clearly seen in Fig. 3, electrode 17 is a beveled member, having a knife edge 18*a* extending transversely to the signal storage means 19 when the storage means is disposed in operative relation to the electrode. Electrode 17 is mounted on an insulating member 22 having secured thereto two metallic members 23 and 24 electrically connected by lead 25 which is connected to ground by lead 26. Members 23 and 24 serve as a shield means which will limit the width of the recording field produced by member 17 as will hereinafter be more fully described.

Referring again to Fig. 1, a second electrode 27 connected to ground by means of lead 28 is located closely adjacent to electrode 17 thereby defining a gap between the two electrodes. Member 27 also serves as a support and tensioning means whereby signal storage means 19 is accurately guided beneath electrode 17 and is supported in the proper operative position. Storage means 19 as shown in Fig. 1 is in the form of a tape which is adapted to be unwound from storage reel 29 onto takeup reel 30, the tape being driven by means of rollers 20 and 21 which may be actuated in the direction of the arrows by any suitable means such as a synchronous motor or the like. Suitable spring means (not shown) is provided on reel 30 to enable storage means 19 to be wound under tension on takeup reel 30. In this manner, successive portions of the storage means are passed between electrodes 17 and 27 and are thereby subjected to the electric field existing between the two electrodes. Mounted in a suitable manner on the under surface of electrode 27 is a piezoelectric crystal 31 which is connected to a high frequency signal generator 32 by means of leads 33 and 34 which are connected to electrodes 35 and 36 mounted on opposite faces of the crystal. Oscillating voltages produced by generator 32 and impressed on the crystal 31 by means of electrodes 35 and 36 will cause vibrations of the crystal in a well-known manner, and the generator 32 is adapted to produce ultrasonic vibrations of the crystal.

Since the crystal 31 is fixed to electrode 27 which in turn supports the signal storage means 19, vibrations of the crystal will be transferred to the storage means through the intermediary of electrode 27. In this manner, the storage means is excited in the vicinity of the electric field. Such excitation enables the storage means more readily to change its ferroelectric properties under the influence of a varying electric field. The storage means may also be excited by variations of the electric field, in which case the crystal 31 may be eliminated and the battery 16 may be replaced by an ultrasonic or an R. F. bias in the form of a high frequency signal generator or the like. The signal storage means may also be sensitized by heat and accordingly the piezo-electric crystal may be replaced by a conventional heating element mounted immediately beneath electrode 27. In each case, the source of energy will produce the desired excitation of the storage means.

Referring now to Fig. 2, the operation of the shield means 23 and 24 will be more fully described. Electric field lines 37 are schematically indicated as emanating from electrode 17, and the portion of the field 38 which is shown as impinging on the storage means 19 may be referred to as the effective field, and that portion of the field 39 which impinges on members 23 and 24 may be referred to as the stray field.

It is apparent that since members 23 and 24 are formed of conductive material and are connected to ground that the stray field will be shunted to ground through these members. In this manner, the stray field is prevented from impinging upon the signal storage means. The effective field is limited by the gap between adjacent ends of members 23 and 24 and thereby the area of the storage means upon which the electric field may impinge is accordingly limited. Such limitation enables the recording of higher frequencies than is possible without the use of shield means.

Since the width of the effective field, in combination with the recording speed, determines the frequency response, it is desirable that the effective field be focussed upon the storage means. Accordingly, shield electrodes 23 and 24 may be subjected to a bias voltage. Such focussing is advantageous in that the effective field is intensified since a portion of the former stray field in Fig. 2 is caused to impinge upon the storage means and thereby contributes to the recording.

In the preceding description, the electrodes 17 and 27 are located on opposite sides or faces of the storage means whereby the electric lines of the polarizing field penetrate the storage means transversely to its movement, and as a result, a transverse polarization of the storage means occurs. However, the electrodes may also be spaced along the carrier in a longitudinal direction, being located on the same side of the storage means. In such a case, the zones of varying polarization will extend along the storage means in a longitudinal direction resulting in a longitudinal polarization.

Referring now to Fig. 4, there is shown a cross-sectional view of a head which is adapted for recording or playback where longitudinal polarization of the storage means is utilized. An insulating member 40 has electrodes 41 and 42 secured at opposite ends thereof, and a suitable insulator 43 formed of rubber, ceramic or the like material is secured to the outer ends of the electrodes. Member 43 prevents the electrodes from being short-circuited and provides an efficient capacitive path through the signal storage means 44 as indicated by the dotted field lines 45. Suitable means is provided whereby the storage means is urged into engagement with member 43 as the storage means moves relative to the electrodes, similar to the manner in which storage means 19 in Fig. 1 is urged into engagement with electrode 27. To obtain the greatest efficiency, the dielectric constant of member 43 should be matched to that of the storage means 44. The modulating voltage, superimposed upon a bias voltage, is impressed upon the electrodes 41 and 42 through suitable leads 46 and 47.

From the foregoing, it is apparent that a method is provided for recording signals in which successive portions of a signal storage means containing a ferroelectric substance are subjected to an electric field which is varied in accordance with the signals to be recorded. The method may be further refined to give better results by providing shield means to concentrate or focus the electric field, and a source of energy may also be employed to cause an excitation of the storage means in the vicinity of the electric field.

It should be understood that a similar method may be utilized for recording with other types of storage means such as drums, discs, coated wires or dielectric strings, provided that suitable means is furnished to dispose the storage means in operative relation to the electric field.

In order to reproduce the recorded signal, the varying dielectric constant and conductivity which exist along the track of the storage means may be utilized by passing the track closely adjacent the electrodes of a playback capacitor, whereby the dielectric constant and consequently the capacity of the capacitor is varied according to the variations in the dielectric properties of the storage means. The playback capacitor is charged by a D.-C. voltage and the varying capacity of the capacitor may be utilized to reproduce the recorded signals in the form of output voltages across a load impedance in an electrical network the circuitry of which is similar to that of a condenser microphone. The playback head utilized with transversely polarized storage means may be similar to the recording head shown in Figs. 1–3 and the playback head utilized with longitudinally polarized storage means may be similar to the recording head shown in Fig. 4.

A more sensitive method of playback may be obtained by providing a local oscillator whose R. F. oscillations are modulated by the playback capactior. The varying capacity of the playback head produces FM which may be converted into electrical signals by means of an FM discriminator or an FM receiver, whereas the varying R. F. conductivity or power factor of the storage means produces AM which may be converted into electrical signals by means of a detector or a conventional AM receiver. The efficiency can be increased and the signal-to-noise ratio can be improved by reproducing the recorded signals simultaneously in a combined FM and AM discriminator or receiver.

The track impressed in the signal carrier may be erased by subjecting the storage means to a strong D. C. or A. C. field and such erasure may be facilitated by exciting the storage means in the vicinity of the field by means of an external source of ultrasonic vibration or by heat.

The operation of the device as illustrated in Fig. 1 is as follows: The rollers 20 and 21 continuously rotate such that successive portions of the storage means are disposed in operative relation to electrode 17. Sound waves are picked up by microphone 10 and are transformed into electrical energy which is amplified by amplifier 13, the output of which is impressed upon electrode 17 by means of lead 15. As the output voltage of the amplifier 13 varies in accordance with signals received by member 10, the field produced between electrodes 17 and 27 will also vary in accordance with the signals to be recorded. Since electrode 27 is connected to ground by lead 28 and the other output lead 14 of the amplifier is connected to ground by lead 18, the circuit is closed. The shield members 23 and 24 serve to limit the effective field and the crystal 31 serves to excite the storage means to thereby facilitate changes in the dielectric properties of the storage means.

It is apparent from the foregoing that a new and novel signal storage means is provided which is very sensitive to variations in an electric field impressed thereon and which may be utilized in a recording method and system which will give a high frequency response and a high signal-to-noise ratio with low power requirements, such system being simple and inexpensive in construction, yet efficient and accurate in operation.

Obviously many modifications and variations of the present invention are possible in the light of the above teachings. It is therefore to be understood that within the scope of the appended claims the invention may be practiced otherwise than as specifically described.

We claim:

1. A signal recorder which comprises means for producing an electric field, signal storage means composed at least partially of a ferroelectric substance, means associated with and adapted to move said storage means relative to said first mentioned means such that successive portions of said storage means are disposed in operative relation to said first mentioned means, means associated with said first mentioned means and being adapted to vary said field in accordance with the signals to be recorded, and shield means associated with said first mentioned means and adapted to limit said electric field by preventing at least a portion of the stray field associated with said electric field from impinging upon said storage means.

2. A signal recorder which comprises means for producing an electric field, signal storage means composed at least partially of a ferroelectric substance, means associated with and adapted to move said storage means relative to said first mentioned means such that successive portions of said storage means are disposed in operative relation to said first mentioned means, means associated with said first mentioned means and being adapted to vary said shield in accordance with the signals to be recorded, shield means associated with said first mentioned means, and biasing means cooperating with said shield means whereby said electric field is concentrated.

3. A signal recorder which comprises two electrodes for producing an electric field, an insulating member secured to adjacent ends of said electrodes and bridging the gap therebetween, signal storage means composed at least partially of a ferroelectric substance, means associated with and adapted to move said storage means relative to said electrodes such that successive portions of said storage means are in contact with said member, and means associated with said electrodes for varying said field in accordance with signals to be recorded.

4. A signal recorder which comprises means for producing an electric field, said means including two electrodes defining a gap therebetween, signal storage means composed at least partially of a ferroelectric substance, one of said electrodes providing a support for said storage means, means associated with and adapted to move said storage means such that successive portions of said storage means are disposed in operative relation to said gap, means associated with said first mentioned means and being adapted to vary said field in accordance with the signals to be recorded, and shield means having at least one metallic member located adjacent the other of said electrodes to limit said electric field by preventing at least a portion of the stray field associated with said electric field from impinging upon said storage means.

5. A signal recorder which comprifes means for producing an electric field, said means including two electrodes defining a gap therebetween, signal storage means composed at least partially of a ferroelectric substance, one of said electrodes providing a support for said storage means, means associated with and adapted to move said storage means such that successive portions of said storage means are disposed in operative relation to said gap, means associated with said first mentioned means and being adapted to vary said field in accordance with the signals to be recorded, shield means having at least one metallic member located adjacent the other of said electrodes, and biasing means cooperating with said shield means whereby said electric field is concentrated.

6. A signal recorder which comprises means for producing an electric field, said means including two electrodes defining a gap therebetween, an electrical network connected to said electrodes, said network including a source of electrical energy, amplifying means and transducing means, signal storage means composed at least partially of a ferroelectric substance, one of said electrodes providing a support for said storage means, means associated with and adapted to move said storage means such that successive portions of said storage means are disposed in operative relation to said gap, a source of energy located adjacent said supporting electrode and adapted to cause an excitation of said storage means, and shield means associated with the other of said electrodes and including at least one metallic member located adjacent said other electrode whereby said electric field is limited by preventing at least a portion of the stray field associated with said electric field from impinging upon said storage means.

7. A signal recorder which comprises means for producing an electric field, said means including two electrodes defining a gap therebetween, an electrical network connected to said electrodes, said network including a source of electrical energy, amplifying means and transducing means, signal storage means composed at least partially of a ferroelectric substance, one of said electrodes providing a support for said storage means, means associated with and adapted to move said storage means such that successive portions of said storage means are disposed in operative relation to said gap, a source of energy located adjacent said supporting electrode and adapted to cause an excitation of said storage means, shield means associated with the other of said electrodes and having at least one metallic member located adjacent said other electrode, and biasing means cooperating with said shield means whereby said electric field is concentrated.

References Cited in the file of this patent

UNITED STATES PATENTS

| | | |
|---|---|---|
| 1,859,551 | Chromy | May 24, 1932 |
| 1,891,780 | Rutherford | Dec. 20, 1932 |
| 1,926,406 | Rieber | Sept. 12, 1933 |
| 2,698,928 | Pulvari | Jan. 4, 1955 |